(12) United States Patent
Shukla et al.

(10) Patent No.: US 6,198,038 B1
(45) Date of Patent: Mar. 6, 2001

(54) BURNER AND BURNER/EMITTER/RECUPERATOR ASSEMBLY FOR DIRECT ENERGY CONVERSION POWER SOURCES

(75) Inventors: Kailash C. Shukla, Boxborough; Edward F. Doyle, Dedham; Christopher I. Metcalfe, Walpole, all of MA (US)

(73) Assignee: Thermo Power Corporation, Waltham, MA (US)

( * ) Notice: Subject to any disclaimer, the term of this patent is extended or adjusted under 35 U.S.C. 154(b) by 0 days.

(21) Appl. No.: 09/483,043

(22) Filed: Jan. 13, 2000

(51) Int. Cl.[7] .................... H01L 31/058; H01L 31/04
(52) U.S. Cl. .................... 136/253; 136/291; 136/205; 431/100; 431/115; 431/116
(58) Field of Search .................... 136/253, 291, 136/205; 431/100, 115, 116

(56) References Cited

U.S. PATENT DOCUMENTS

| | | | |
|---|---|---|---|
| 2,224,544 | * 12/1940 | Keller | 431/115 |
| 4,023,921 | * 5/1977 | Anson | 431/115 |
| 4,707,560 | 11/1987 | Hotteletal | 136/253 |
| 5,312,521 | 5/1994 | Fraas et al. | 136/253 |
| 5,439,532 | 8/1995 | Fraas | 136/253 |
| 5,512,109 | 4/1996 | Fraas et al. | 136/253 |
| 5,651,838 | 7/1997 | Fraas et al. | 136/253 |
| 5,711,661 | * 1/1998 | Kushch et al. | 431/329 |
| 5,932,885 | * 8/1999 | DeBellis et al. | 250/493.1 |

OTHER PUBLICATIONS

Kittl et al, 25th Annual Proceedings Power Sources Conference, May 1972.*

* cited by examiner

*Primary Examiner*—Alan Diamond
(74) *Attorney, Agent, or Firm*—Pandiscio & Pandiscio

(57) ABSTRACT

A burner/emitter/recuperator assembly for providing a high temperature radiant emitting surface, includes an elongated fuel pipe in communication with a fuel source and extending toward the combustion chamber, and adapted to flow fuel from the fuel source to a nozzle end of the fuel pipe proximate the combustion chamber, a primary air pipe disposed around the fuel pipe and in communication with a relatively cool primary air source, a nozzle end of the primary air pipe being substantially coincident with the nozzle end of the fuel pipe, and a recuperator for preheating secondary air disposed around a distal portion of the primary air pipe and in communication with a secondary air source and a swirler downstream of the recuperator. The relatively cool air from the primary air source and fuel from the fuel source flow through the primary air pipe and the fuel pipe, respectively, and mix with the hot air from the recuperator and swirler, exterior to the fuel nozzle and the primary air pipe nozzle end, to maintain a relatively cool fuel pipe nozzle end, and a relatively hot flame in the combustion chamber.

28 Claims, 2 Drawing Sheets

BURNER AND BURNER/EMITTER/ RECUPERATOR ASSEMBLY FOR DIRECT ENERGY CONVERSION POWER SOURCES

STATEMENT OF GOVERNMENT INTEREST

The invention described herein may be manufactured, used and licensed by or for the U.S. Government for Governmental purposes without the payment of any royalty thereon.

BACKGROUND OF THE INVENTION

1. Field of the Invention

The invention relates to logistic-fueled direct energy conversion power sources, such as thermophotovoltaic (TPV), thermoelectric (TE), and alkali-metal-thermal-to-electric-conversion (AMTEC) devices, and is directed more particularly to a burner and a bumer/emitter/recuperator (BER) assembly for use in such power sources.

2. Description of the Prior Art

Two major components of a direct energy conversion power source are (1) a burner/emitter recuperator (BER) assembly, and (2) a power converter assembly (PCA). The objective of the BER is to burn fuel cleanly with the lowest amount of parasitic power consumption and to convert the highest fraction of combustion energy in the fuel to radiant thermal energy. Logistic fuels, as defined by the U.S. military, include diesel (DF-2) and JP-8, and have been preferred inasmuch as they provide the advantages of high energy density and transportability. The PCA converts the radiant thermal energy directly into electrical power through thermophotovoltaics (TPV), thermoelectric (TE), or alkali-metal-thermal-to-electric-conversion (AMTEC).

For small power sources with high system efficiencies, the fuel-firing rate is very low. For instance, a 250 $W_e$ power source with a system efficiency of 10% (fuel to electric power) has a fuel firing rate of only 0.07 gallons per hour. To achieve 10% or higher efficiency, the combustion air has to be preheated to a temperature of at least 2000° F. The combination of logistic fuel, very low fuel firing rate, and very high air preheat temperature makes the burner design extremely challenging. The conventional pressure-atomized retention head burners cannot be used for such low fuel firing rates because of the extremely small orifice size involved. Other advanced burner designs for low fuel firing rates, such as ultrasonic atomization burners, electrostatic atomization burners, air atomized burners, vaporizing burners, and Babington atomizers have their own unique problems for this application, mostly resulting from extremely high air preheat temperature (about 2000° F.), super high flame temperature (about 4000° F.), or very high combustion chamber temperature (about 3000° F.). For example, the very high temperature of the combustion air causes "coking" of the burner nozzle outlet, i.e. accumulation of fuel residues which, because the orifices are extremely small, leads to blockage of orifices, malfunctioning of the burner, and breakdown of the power assembly.

There is thus a need for a burner and a burner/emitter/ recuperator (BER) assembly for power converters, which burner and assembly uses logistic fuel with very high temperature combustion air, produces a high flame temperature, maintains a high combustion temperature, and has the following features:

Does not suffer from fuel coking;
Has smooth ignition without smoke or unburned hydrocarbon emissions;
Provides precise fuel flow regulation;
Can operate at very low ambient temperatures; and
Has low parasitic power requirements.

SUMMARY OF THE INVENTION

Accordingly, an object of the invention is to provide a burner and BER assembly for direct power conversion devices, which meets the above described requirements.

With the above and other objects in view, as will hereinafter appear, a feature of the present invention is the provision of a burner assembly for supporting a flame in a combustion chamber, the assembly comprising an elongated fuel pipe in communication with a fuel source and extending toward the combustion chamber, and adapted to flow fuel from the fuel source to a nozzle end of the fuel pipe proximate the combustion chamber. The invention further includes a primary air pipe disposed around the fuel pipe and in communication with a relatively cool primary air source, a nozzle end of the primary air pipe being substantially coincident with the nozzle end of the fuel pipe, and a preheated air manifold disposed around a distal portion of the primary air pipe and in communication with a secondary air source. The relatively cool air from the primary air source and fuel from the fuel source flow through the primary air pipe and fuel pipe, respectively, and mix with the hot air from the manifold, exterior to the fuel pipe nozzle end and the primary air pipe nozzle end, to maintain a relatively cool fuel pipe nozzle end, and a relatively hot flame in the combustion chamber.

In accordance with a further feature of the invention, there is provided a burner assembly for supporting a flame in a combustion chamber, the assembly comprising an elongated fuel pipe for flowing fuel from a fuel source to a nozzle end of the fuel pipe proximate the combustion chamber. The assembly further includes a primary air pipe disposed around the fuel pipe and in communication with a relatively cool primary air source, a nozzle end of the primary air pipe being substantially coincident with the nozzle end of the fuel pipe, and a recuperator for preheating secondary air disposed around a distal portion of the primary air pipe and in communication with a secondary air source. The relatively cool air from the primary air source and fuel from the fuel source flow through the primary air pipe and fuel pipe, respectively, and mix with the hot air from the recuperator, exterior to the fuel pipe nozzle end and the primary air pipe nozzle end, to maintain a relatively cool fuel pipe nozzle end, and a relatively hot flame in the combustion chamber.

In accordance with a still further feature of the invention, there is provided a burner/emitter/recuperator (BER) assembly for a direct energy conversion power source, the assembly comprising a burner assembly for supporting a flame in a combustion chamber, the burner assembly comprising a fuel pipe for flowing fuel from a fuel source and extending toward the combustion chamber, a primary air pipe disposed around the fuel pipe and in communication with a relatively cool primary air source, a nozzle end of the primary air pipe being substantially coincident with a nozzle end of the fuel pipe, and a secondary air manifold disposed around the primary air pipe and in communication with a secondary air source, the secondary air manifold being adapted to flow secondary air to the nozzle ends. The BER further comprises a recuperator assembly comprising an annular channel extending from the combustion chamber and defined in part by the manifold, and adapted to flow combustion gases along a surface of the manifold to impart heat thereto and to the secondary air therein, and an emitter disposed around the combustion chamber, the emitter being adapted to be heated by a flame in the combustion chamber and to radiate thermal heat for conversion to electrical power.

The above and other features of the invention, including various novel details of construction and combinations of parts, will now be more particularly described with reference to the accompanying drawings and pointed out in the claims. It will be understood that the particular devices embodying the invention are shown by way of illustration only and not as limitations of the invention. The principles and features of this invention may be employed in various and numerous embodiments without departing from the scope of the invention.

BRIEF DESCRIPTION OF THE DRAWINGS

Reference is made to the accompanying drawings in which are shown illustrative embodiments of the invention, from which its novel features and advantages will be apparent.

In the drawings.

DESCRIPTION OF THE PREFERRED EMBODIMENT

Figure 1:
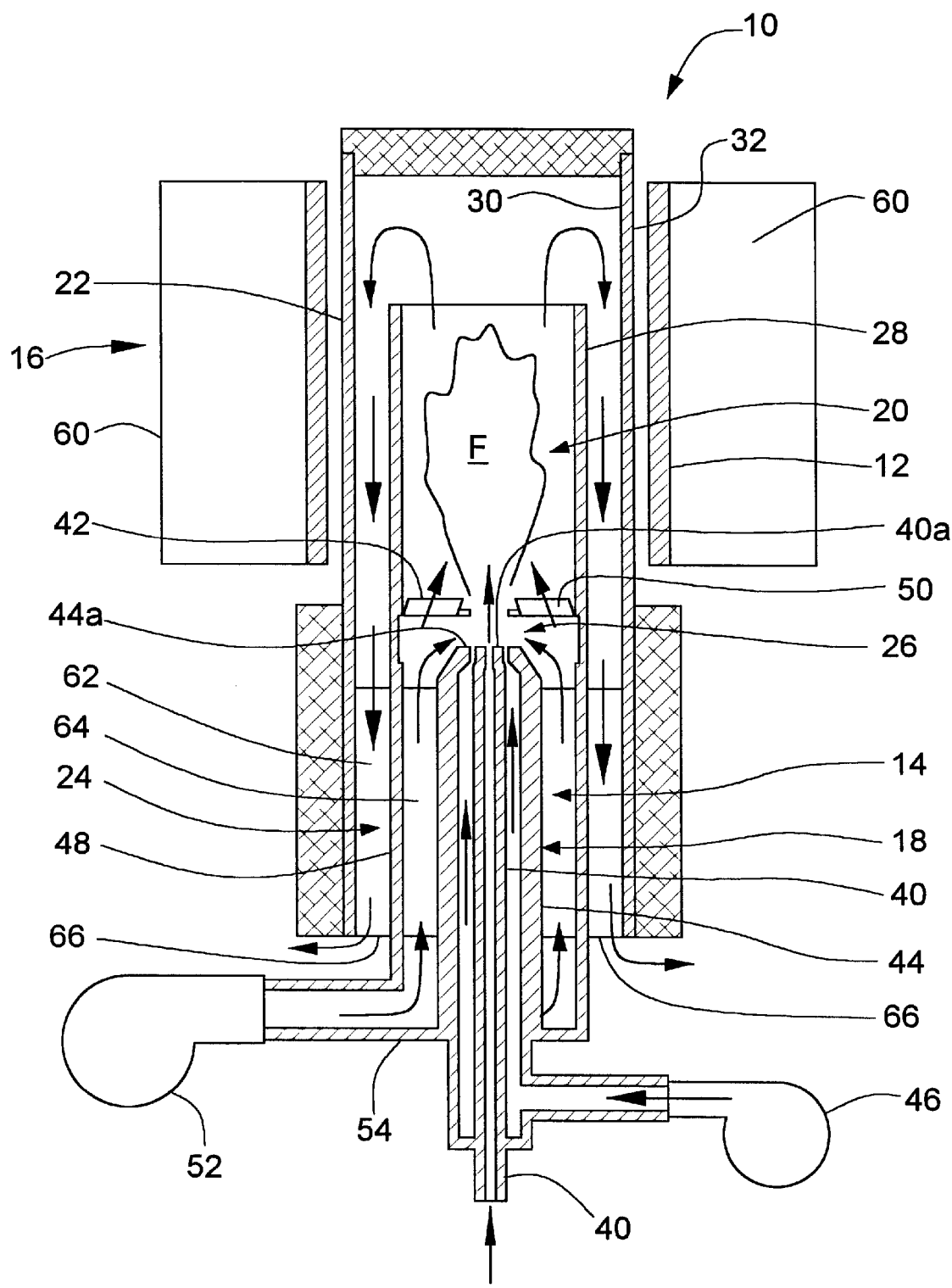
FIG. 1 is a diagrammatic and generally center line sectional view of a direct energy conversion power assembly having a burner and a burner/emitter/recuperator (BER) assembly therein illustrative of embodiments of the invention.

Referring to FIG. 1, it will be seen that a direct energy conversion power assembly 10 includes a burner/emitter/recuperator (BER) module 14 and a power converter assembly (PCA) 16.

The BER module 14 includes a burner assembly 18 for producing and supporting a flame F in a combustion chamber 20 defined by a radiator 28. The BER 14 further includes an emitter 22 for radiating thermal energy, and a recuperator 24 for transferring heat from exhaust gases from the combustion chamber 20 to incoming air traveling towards a discharge nozzle 26 of the burner assembly 18.

Figure 2A:
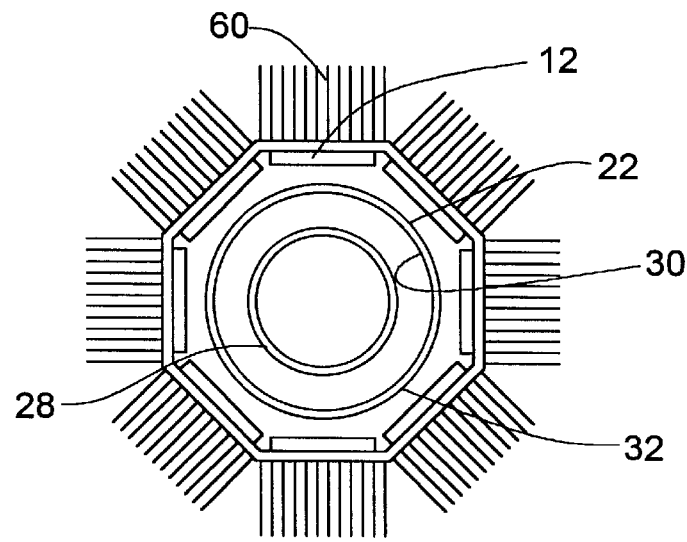
FIGS. 2A–2C are sectional views of the power converter assembly of FIG. 1, showing alternative power converter assemblies with which the inventive BER assembly finds utility-thermophotovoltaic (FIG. 2A); thermoelectric (FIG. 2B); and alkali-metal-thermal-to-electric-conversion (FIG. 2C).
Figure 2B:
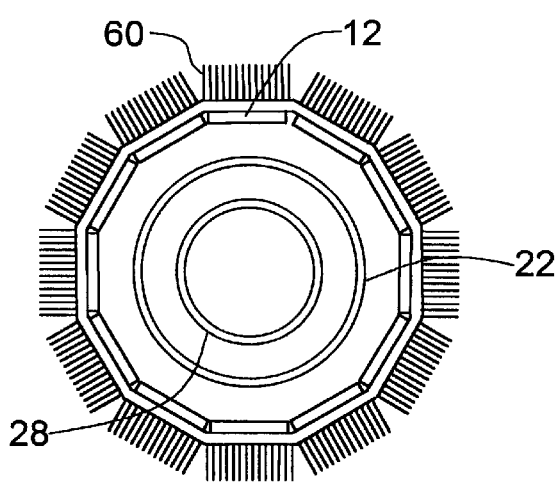
Figure 2C:
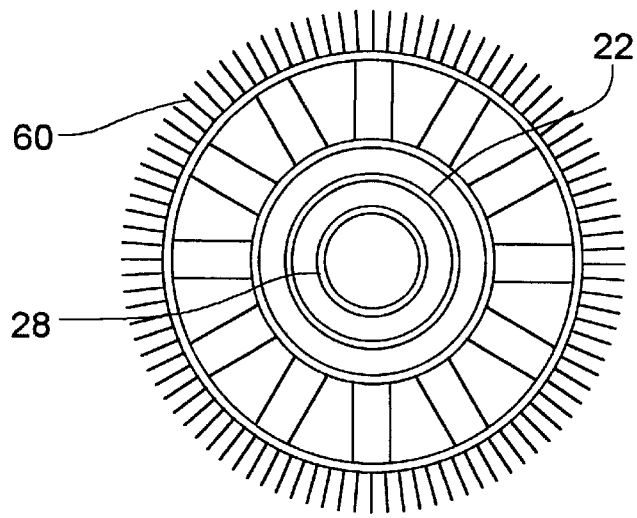

The PCA 16 includes a power converter 12 which converts the radiant thermal energy from the emitter 22 directly into electrical power, in known fashion. In a thermophotovoltaic application, the emitter 22 of the invention may be provided with an inner surface 30 (FIG. 2A) of silicon carbide and an outer emitting surface 32 of a refractory metal, such as tungsten, tantalum, rhenium, molybdenum, or niobium; or a selected noble metal, such as palladium, platinum, rhodium, iridium, or osmium, as is known. The emitting surface may be microstructured to provide enhanced radiant emission in a narrow band matching a photocell spectral response. Alternatively, the emitter 22 may be provided with a Kanthal® (an iron chromium alloy including aluminum) inner surface 30 and an outer surface of microstructured palladium or platinum.

The burner assembly 18 includes an elongated fuel pipe 40 in communication with a fuel source (not shown), and extending toward the combustion chamber 20 and adapted to flow fuel from the fuel source to a nozzle end 40a of the pipe 40 proximate the combustion chamber 20.

A primary air pipe 44 is disposed around the fuel pipe 40 and is in communication with a relatively cool air source, such as a primary air pump 46. A nozzle end 44a of the primary air pipe 44 is disposed substantially coincident with the nozzle end 40a of the fuel pipe 40.

The recuperator 24 includes a manifold 48 for pre-heating secondary air. The manifold 48 comprises a portion of the recupertor 24 and is disposed around a distal portion of the primary air pipe 44 and is in communication with an air source, such as a secondary air pump 52, as by a conduit 54. A secondary air swirler 50, in the form of an annular arrangement of baffle blades 42, is located downstream of the nozzles 40a, 44a in the secondary air stream and serves to swirl the fuel/air mixture and further mix the fuel and air.

In operation, relatively cool primary air from the primary air pump 46, and relatively cool fuel from the fuel source flow through the primary air pipe 44 and the fuel pipe 40, respectively. Upon emerging from the nozzle ends 40a, 44a of the fuel pipe 40 and primary air pipe 44, respectively, the primary air atomizes the fuel and, passing through the swirler 42, mixes with and combusts with the hot secondary air from the recuperator manifold 48. The combustion occurs exterior to the nozzle end 40a of the fuel pipe 40 and the nozzle end 44a of the primary air pipe 44, to maintain a relatively cool fuel pipe nozzle end 40a and a hot flame in the combustion chamber 20. The cool fuel pipe nozzle end 40a is not subject to coking, but the hot combustion flame and hot combustion chamber provide for clean, rapid, and efficient combustion of fuel. The secondary air exiting the recuperator 24 and swirler 42 is maintained at a temperature of about 2000° F., while the primary air is at ambient temperature. The flame produced thereby typically is at a temperature of about 4000° F. and the combustion chamber temperature is maintained at a temperature of about 3000° F.

Of the combustion air mixing with the fuel at the nozzle ends 40a, 44a, and swirler 42, about 10–15% is primary air flowed through the primary air pipe 44, and about 85–90% is secondary air flowed through the manifold portion 48 of the recuperator 24.

The fuel preferably is a liquid fuel, such as diesel fuel or JP-8.

The flame maintained in the combustion chamber 20 excites the emitter 22, which radiates thermal energy to the power converter 12 for production of electrical energy.

Cooling fins 60 on the PCA remove heat from the power converter 12. Gases from the combustion chamber 20 pass over the open top of the radiator 28 and down through the recuperator 24, where heat is transferred by fins 62, 64 from the outgoing hot gases to secondary air entering the recuperator 24. The exhaust gases, cooled by passage through the recuperator 24, pass through outlets 66.

There is thus provided a burner and a burner/emitter/recuperator assembly which uses logistic fuel with very high temperature combustion air to produce a high flame temperature, maintains a high combustion temperature, provides smooth ignition without smoke or unburned hydrocarbon emissions, operates at very low ambient temperature, and does not suffer from fuel coking.

It is to be understood that the present invention is by no means limited to the particular constructions herein disclosed and/or shown in the drawings, but also comprises any modifications or equivalents within the scope of the claims.

What is claimed is:

1. A burner/emitter/recuperator (BER) assembly, the assembly comprising a burner assembly for supporting a flame in a combustion chamber, said burner assembly comprising:

an elongated fuel pipe in communication with a fuel source and extending toward the combustion chamber, and adapted to flow fuel from the fuel source to a nozzle end of said fuel pipe proximate the combustion chamber; and a primary air pipe disposed around said fuel pipe and in communication with a relatively cool primary air source, a nozzle end of said primary air pipe being substantially coincident with the nozzle end of said fuel pipe; and a recuperator assembly comprising:

a preheated air manifold disposed around a distal portion of said primary air pipe and in communication with a relatively hot secondary air source;

wherein the relatively cool air from the primary air source and fuel from the fuel source flow through said primary air pipe and said fuel pipe, respectively, and mix with the hot air from said manifold exterior to said fuel pipe nozzle end and said primary air pipe nozzle end, to maintain a relatively cool fuel pipe nozzle end, and a relatively hot flame in the combustion chamber; and an emitter disposed around the combustion chamber, said emitter being adapted to be heated by the flame in the combustion chamber and to radiate thermal heat for conversion to electrical power.

2. The BER assembly in accordance with claim 1, wherein in operation of the BER assembly said relatively hot secondary air is at a temperature of about 2000° F. and said relatively cool primary air is at generally ambient temperature.

3. The BER assembly in accordance with claim 2, wherein said relatively hot flame is at a temperature of about 4000° F.

4. The BER assembly in accordance with claim 3, wherein the combustion chamber operates at a temperature of about 3000° F.

5. The BER assembly in accordance with claim 1 wherein the fuel flowed through the fuel pipe is liquid fuel.

6. The BER assembly in accordance with claim 5 wherein the fuel is a selected one of diesel fuel and JP-8 fuel.

7. The BER assembly in accordance with claim 1 wherein said fuel pipe is adapted to flow liquid fuel.

8. The BER assembly in accordance with claim 7 wherein the liquid fuel is a selected one of diesel fuel and JP-8 fuel.

9. The BER assembly in accordance with claim 1 wherein said primary air pipe is adapted to flow about 10–15% of total combustion air to said primary air pipe nozzle end.

10. The BER assembly in accordance with claim 9 wherein said secondary air manifold is adapted to flow about 85–90% of total combustion air to said nozzle ends.

11. A burner/emitter/recuperator (BER) assembly for providing a high temperature radiant emitting surface, said assembly comprising:

a burner assembly for supporting a flame in a combustion chamber, the burner assembly comprising an elongated fuel pipe in communication with a fuel source and extending toward the combustion chamber, and adapted to flow fuel from the fuel source to a nozzle end of said fuel pipe proximate the combustion chamber, a primary air pipe disposed around said fuel pipe and in communication with a relatively cool primary air source, a nozzle end of said primary air pipe being substantially coincident with the nozzle end of said fuel pipe;

a recuperator assembly for preheating secondary air disposed around a distal portion of said primary air pipe and in communication with a secondary air source, wherein the relatively cool air from the primary source and fuel from the fuel source flow through said primary air pipe and said fuel pipe, respectively, and mix with the hot air from said recuperator exterior to said fuel pipe nozzle end and said primary air pipe nozzle end, to maintain a relatively cool fuel pipe nozzle end, and a hot flame in the combustion chamber; and an emitter disposed around the combustion chamber, said emitter being adapted to be heated by the flame in the combustion chamber and to radiate thermal heat for conversion to electrical power.

12. The BER assembly in accordance with claim 11, wherein in operation of the BER assembly said hot secondary air is at a temperature of about 2000° F. and said relatively cool primary air is at generally ambient temperature.

13. The BER assembly in accordance with claim 12, wherein said hot flame is at a temperature of about 4000° F.

14. The BER assembly in accordance with claim 13, wherein the combustion chamber operates at a temperature of about 3000° F.

15. The BER assembly in accordance with claim 11 wherein the fuel flowed through the fuel pipe is liquid fuel.

16. The BER assembly in accordance with claim 15 wherein the fuel is diesel fuel.

17. The BER assembly in accordance with claim 15 wherein said fuel is JP-8.

18. The BER assembly in accordance with claim 11 wherein said primary air is 10–15% of total combustion air.

19. The BER assembly in accordance with claim 18 wherein said secondary air is 85–90% of total combustion air.

20. A burner/emitter/recuperator (BER) assembly for a direct energy conversion power source, the assembly comprising:

a burner assembly for supporting a flame in a combustion chamber, the burner assembly comprising:

a fuel pipe for flowing fuel from a fuel source and toward the combustion chamber;

a primary air pipe disposed around the fuel pipe and in communication with a relatively cool primary air source, a nozzle end of the primary air pipe being substantially coincident with a nozzle end of the fuel pipe;

a secondary air manifold disposed around the primary air pipe and in communication with a secondary air source, said secondary air manifold being adapted to flow secondary air to said nozzle ends;

a recuperator assembly comprising;

an annular channel extending from the combustion chamber and defined in part by said manifold and adapted to flow combustion gases along a surface of said manifold to impart heat thereto and to the secondary air therein; and an emitter disposed around the combustion chamber, said emitter being adapted to be heated by a flame in the combustion chamber and to radiate thermal heat for conversion to electrical power.

21. The BER assembly in accordance with claim 20 and further comprising a radiator in part defining the combustion chamber, and said emitter is disposed around said radiator.

22. The BER assembly in accordance with claim 21 wherein the combustion chamber is open at an end remote from said burner such that combustion gases are flowable out the combustion chamber open end and through the recuperator annular channel.

23. The BER assembly in accordance with claim 21 and further comprising a swirler mounted in said radiator proximate said nozzle ends for mixing fuel and air from said burner.

24. The BER assembly in accordance with claim 20, wherein an emitting surface of said emitter is a refractory metal selected from a group of refractory metals, said group consisting of tungsten, tantalum, rhenium, molybdenum, and niobium and a group of noble metals, said noble metal group consisting of platinum, palladium, rhodium, iridium and osmium.

25. The BER assembly in accordance with claim 24 wherein the emitting surface is microstructured to provide enhanced radiant emission in a narrow band matching a photocell spectral response.

26. The BER assembly in accordance with claim 20 wherein said emitter is provided with an inner surface of an iron-chromium-aluminum alloy and an outer surface of a selected one of palladium and platinum.

27. The BER assembly in accordance with claim 26 wherein said outer surface is microstructured.

28. A burner/emitter/recuperator (BER) assembly for a direct energy conversion power source, the assembly comprising:

a burner assembly having a fuel inlet and an air inlet for supporting a flame in a combustion chamber;

a recuperator assembly adapted to flow combustion gases from said combustion chamber along a surface of said burner assembly for imparting heat to incoming combustion air in said air inlet; and an emitter disposed around the combustion chamber, said emitter being adapted to be heated by the flame in the combustion chamber and to radiate thermal heat for conversion to electrical power, said emitter having an inner surface of an iron-chromium-aluminum alloy and an outer surface of a selected one of platinum and palladium.

* * * * *